United States Patent [19]
Law et al.

[11] Patent Number: 5,760,743
[45] Date of Patent: Jun. 2, 1998

[54] MISS DISTANCE INDICATOR DATA PROCESSING AND RECORDING APPARATUS

[75] Inventors: Eugene Lloyd Law, Ventura; Joseph Bradley; Ronald Kingery, both of Oxnard, all of Calif.

[73] Assignee: The United States of America as represented by the Secretary of the Navy, Washington, D.C.

[21] Appl. No.: 700,744

[22] Filed: Jul. 25, 1996

[51] Int. Cl.$^6$ ............................................. G01S 3/02
[52] U.S. Cl. ............................... 342/458; 342/119
[58] Field of Search ............................ 342/119, 458, 342/109, 107

[56] References Cited

U.S. PATENT DOCUMENTS

| | | | |
|---|---|---|---|
| 3,155,971 | 11/1964 | Hansel | 342/119 |
| 3,289,204 | 11/1966 | Murray et al. | 342/119 |
| 3,484,167 | 12/1969 | Burns | 356/5 |
| 3,611,373 | 10/1971 | Cartwright | 343/7.7 |
| 3,897,151 | 7/1975 | Lecroy | 356/5 |
| 5,181,039 | 1/1993 | Oswald et al. | 342/119 |
| 5,283,588 | 2/1994 | Sezai | 342/427 |

*Primary Examiner*—Thomas H. Tarcza
*Assistant Examiner*—Dao L. Phan
*Attorney, Agent, or Firm*—Melvin J. Sliwka; David S. Kalmbaugh

[57] ABSTRACT

A miss distance indicator data processing and recording apparatus comprising an antenna which receives an RF missile telemetry signal from a missile attempting to intercept a target and a translated RF missile telemetry signal from an AN/DRQ-4 miss distance indicator which is on board the target. A first telemetry receiver filters, amplifies and down converts the RF missile telemetry signal to a first predetection carrier signal, and a second telemetry receiver filters, amplifies and down converts the translated RF missile telemetry signal to a second predetection carrier signal. The first and second predetection carrier signals are then supplied to an analog magnetic tape recorder which records the signals. The first and second predetection carrier signals are also supplied to a double balanced mixer which is connected to a frequency analyzer. The double balanced mixer generates a difference frequency signal which includes doppler shift and frequency offset and then supplies the difference frequency signal to the frequency analyzer. Time data is also supplied to the frequency analyzer by a time code source. The frequency analyzer displays a plot of frequency versus time which is used to accurately determine miss distance which is the distance the missile misses the target.

20 Claims, 2 Drawing Sheets

MISS DISTANCE INDICATOR DATA PROCESSING AND RECORDING APPARATUS

BACKGROUND OF THE INVENTION

1. Field of the Invention

The present invention relates generally to miss distance indicator systems. More specifically, the present invention relates to a miss distance indicator system which includes a data processing and recording apparatus and which provides for an accurate measurement of the miss distance from a missile to a target the missile is attempting to intercept.

2. Description of the Prior Art

Miss distance indicator systems which are utilized for an indication of the miss distance from a missile to a target the missile is attempting to intercept consist of both cooperative type and non-cooperative type systems. An example of the non-cooperative type of miss distance indicator is the AN/DSQ-50 miss distance indicator manufactured by the Cartwright Electronics Corporation. The AN/DSQ-50 miss distance indicator utilizes the characteristic of the doppler shift to measure the distance the missile misses the target the missile is attempting to intercept.

Cooperative miss distance indicators include the AN/DRQ-3 and the AN/DRQ-4 miss distance indicators. Each of these miss distance indicators require an RF (radio frequency) transmitter in the missile, an RF receiver and transmitter in the target and a ground station to process data to determine the miss distance.

In particular the AN/DRQ-4 miss distance indicator includes a transponder in a target the missile is attempting to intercept which receives the missile telemetry signal, mixes it with a target local oscillator signal and then transmits the difference frequency to a ground station. The ground station comprises a dual receiver system which receives the signal from the transponder on board the target and the missile telemetry signal from the missile. At the ground station the signals from both receivers are supplied to a DEU-2 doppler extraction unit. The DEU-2 doppler extraction unit mixes these signals with a local oscillator signal and the difference frequencies are mixed together to produce a difference frequency of approximately 124 kHz for recording on a magnetic tape.

The DEU-2 doppler extraction unit is not directly compatible with state of the art telemetry receivers such as the Microdyne 1200 and 1400 telemetry receivers and the Scientific-Atlanta series 930 telemetry receiver. The DEU-2 doppler extraction units, which are approximately 25 years old, would require modification for compatibility with state of the art telemetry receivers or a new unit would have to be developed. In addition, a modified DEU-2 doppler extraction unit or a new unit must generate frequencies which are accurate for recording of a signal.

What is needed is a method and apparatus which allows for the use of the AN/DRQ-4 miss distance indicator with state of the art telemetry receivers with minimal cost associated with its development and maximum reliability associate with its use.

SUMMARY OF THE INVENTION

Accordingly, it is a general purpose and object of the present invention to provide for a miss distance indicator data processing and recording apparatus which is compatible with the AN/DRQ-4 miss distance indicator and state of the art telemetry receivers and which provides a substantial degree of accuracy and reliability in determining the distance a missile misses a target the missile is attempting to intercept.

The miss distance indicator data processing and recording apparatus of the present invention comprises an antenna located adjacent to a ground station which receives an RF missile telemetry signal from the missile tracking the target and a translated RF missile telemetry signal from the AN/DRQ-4 miss distance indicator which is on board the target. Connected to the antenna is a first telemetry receiver which receives the missile telemetry signal from the antenna and a second telemetry receiver which receives the translated missile telemetry signal from the antenna. The first telemetry receiver filters, amplifies and down converts the RF missile telemetry signal to a first predetection carrier signal, while the second telemetry receiver filters, amplifies and down converts the RF target telemetry signal to a predetection carrier signal. The first and second predetection carrier signals are supplied to an analog magnetic tape recorder which records the signals.

The first and second predetection carrier signals are also supplied through the analog magnetic tape recorder to a double balanced mixer which is connected to a frequency analyzer. The double balanced mixer generates a difference frequency signal which includes doppler shift and frequency offset.

The double balanced mixer next supplies the difference frequency signal to the frequency analyzer. Time data is also supplied to the frequency analyzer by a time code source which may be a GPS receiver/generator or an IRIG (Inter Range Instrumentation Group) time code source. The frequency analyzer displays a plot of the AN/DRQ-4 doppler frequency versus time for the which is used to determine miss distance in accordance with the expression:

$$\text{miss distance} = \frac{\Delta f \Delta t \lambda}{4}$$

where $\Delta f$ is a frequency difference which the frequency analyzer determines and then displays; $\Delta t$ is a time difference which the frequency analyzer determines and then displays and $\lambda$ is constant for a missile telemetry signal of a particular frequency which is determined by dividing the speed of light by the frequency of the missile telemetry signal.

DETAILED DESCRIPTION OF THE DRAWINGS

Figure 1:
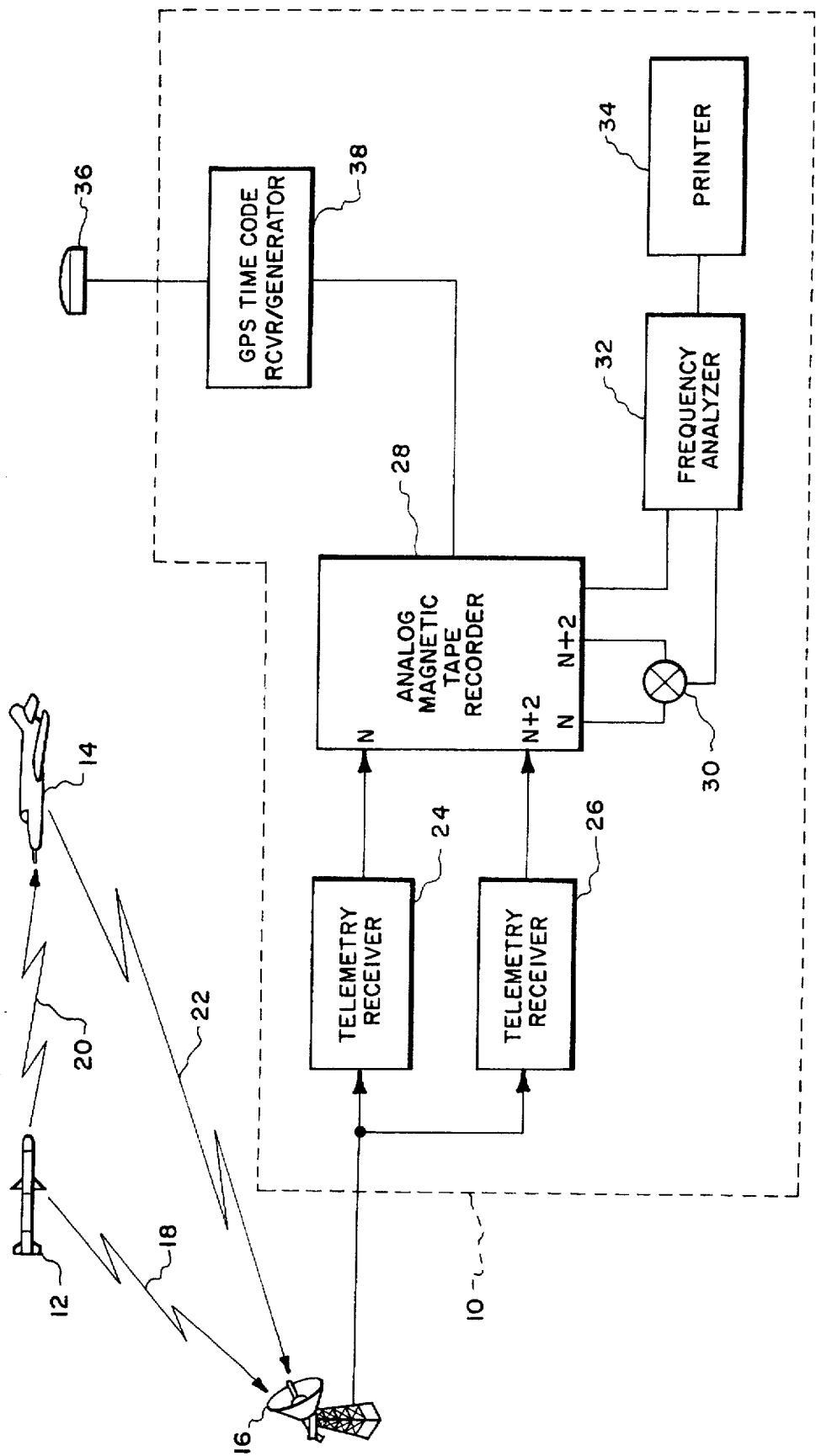
Figure 2:
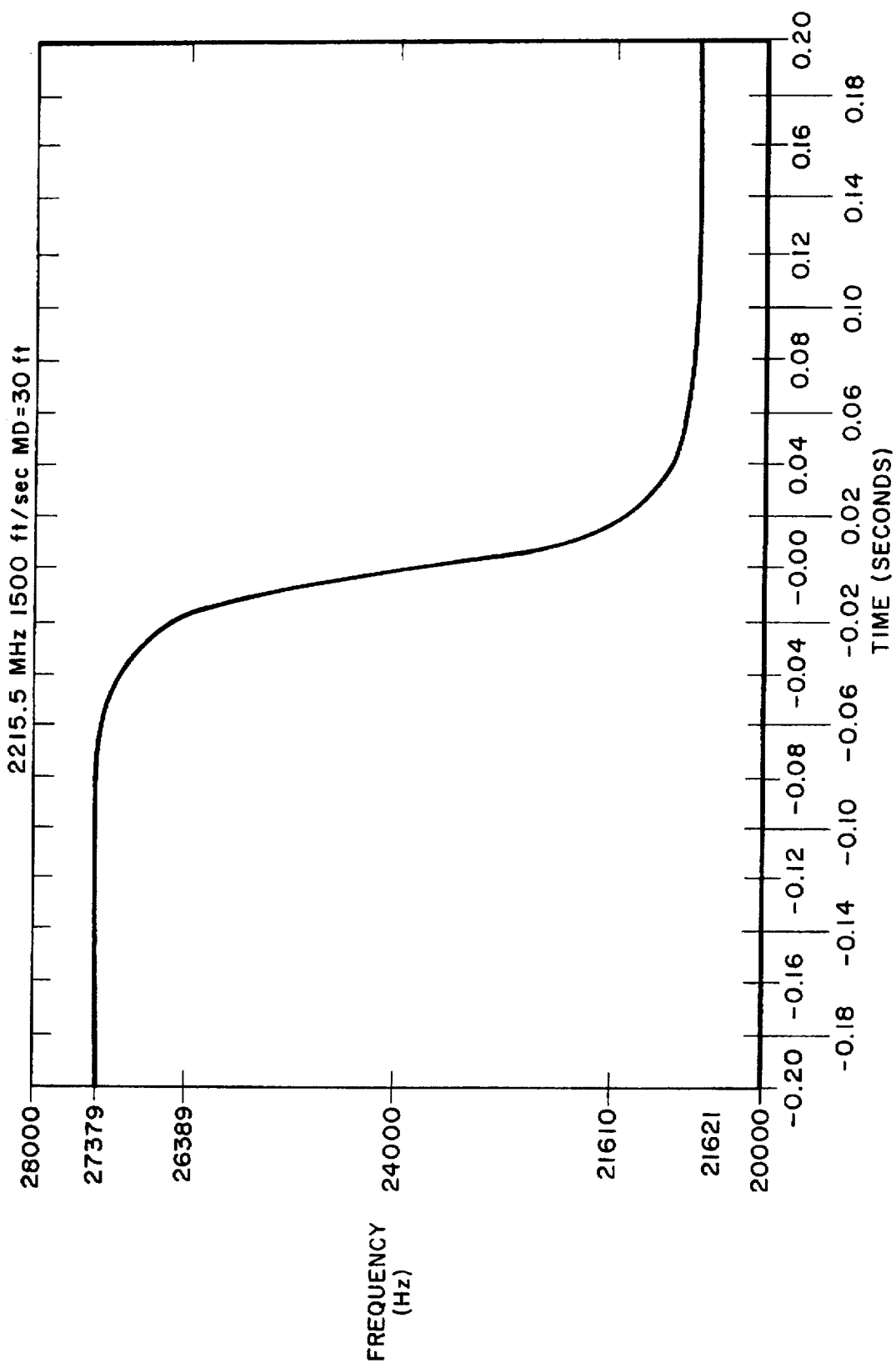

FIG. 1 is a schematic diagram illustrating a preferred embodiment of the miss distance indicator data processing and recording apparatus constituting the present invention; and FIG. 2 is a sample timing plot of Doppler frequency versus time which is displayed on the frequency analyzer of FIG. 1 and which is used to determine miss distance. In this sample timing plot, the missile telemetry frequency is 2215.5 MHz, the missile to target closing velocity is about 1500 feet per second, the miss distance is about 30 feet and the frequency offset is about 24 kHz.

DETAILED DESCRIPTION OF THE PREFERRED EMBODIMENT

Referring now to FIG. 1, a missile 12 is shown attempting to intercept a target 14. Missile 12 includes a telemetry unit having a transmitter and its associated antenna (not illustrated) for transmitting an radio frequency (RF) missile telemetry signal 18 to a receiving antenna 16 located adjacent to a ground station 10. Missile 12 also transmits to target 14 via its telemetry unit an RF missile telemetry signal 20. The frequencies of RF missile telemetry signals 18 and 20 are identical may be between about 2200 and 229 MHz. For the plot of FIG. 2 is approximately 2215.5 MHz.

Target 14 includes a AN/DRQ-4 Cooperative Doppler System which includes a transponder (not illustrated) for receiving the RF missile telemetry signal 20 from missile 12. The AN/DRQ-4 Cooperative Doppler System mixes signal 20 with a local oscillator signal and then transmits a difference frequency which is depicted in FIG. 1 as translated RF missile telemetry signal 22 to receiving antenna 16. The frequency of signal 22 may be between 1778.024 and 1849.024 MHz. For the plot of FIG. 2, the frequency of signal 22 is approximately 1826.024 MHz.

Connected to receiving antenna 16 is telemetry receiver 24 and a telemetry receiver 26 which are located at ground station 10. Telemetry receiver 24 which is the missile receiver is tuned to 22XX.500 MHZ or a downconverted equivalent. When the telemetry signal output of missile 12 is 2215.5 MHz, telemetry receiver 24 is tuned to a frequency of 2215.500 MHz.

Telemetry receiver 26 which operates as an upper L-band receiver is tuned to 1XXX.000 MHZ or a downconverted equivalent. Since the AN/DRQ-4 Cooperative Doppler System RF telemetry signal output is 1826.024 telemetry receiver is tuned to a frequency of 1826.000 MHz.

Receivers 24 and 26 may be Microdyne 1200 telemetry receivers or Microdyne 1400 telemetry receivers commercially available from Microdyne Inc. of Ocala, Fla. In the alternative, receivers 24 and 26 may be Scientific-Atlanta 930 series telemetry receivers commercially available from Scientific Atlanta of Atlanta, Ga. Each of these telemetry receivers has a tuning accuracy of a few kHz (i.e. 2 kHz or less) when all local oscillators are operated in the crystal or synthesizer modes. The short term stability and accuracy of these receives is sufficient to allow their use with the AN/DRQ-4 Cooperative Doppler System.

The intermediate frequency (IF) bandwidth of receiver 24 and receiver 26 are each set to the value normally used to receive missile telemetry data, i.e. the same receiver bandwidth must be used for the receiver tuned to the missile frequency and the receiver tuned to the AN/DRQ-4 frequency.

The same antenna which is receiving antenna 16 in FIG. 1 should be used to receive RF telemetry signal 18 and RF signal 22. In addition, telemetry receivers 24 and 26 should be identical model receivers.

Telemetry receivers 24 and 26 each function to (1) separate the desired signal from noise and other interfering signals by filtering the incoming RF signal and (2) amplify the signal to allow the signal to be recorded.

The output of telemetry receiver 24 is connected to the N track input of an analog magnetic tape recorder 28, while the output of telemetry receiver 26 is connected to the N+2 track input of analog magnetic tape recorder 28. Telemetry receiver 24 provides at its output a predetection carrier of approximately 900 kHz. Telemetry receiver 26 provides at its output an identical predetection carrier signal offset by approximately 924 kHz. The predetection signal from receiver 24 and the predetection signal from receiver 26 includes the same missile telemetry data with a finite time shift.

Analog magnetic tape recorder 28 records missile telemetry data (900 kHz predetection signal) and target telemetry data (924 kHz predetection signal) on adjacent tracks of the same head stack of the recorder.

A GPS Time Code receiver/generator 38 is also connected to analog magnetic tape recorder 28 The GPS Time Code receiver/generator 38 is connected to a GPS receiving antenna 36 which receives global position system (GPS) data from a satellite (not illustrated). The GPS data received by antenna 36 is supplied to GPS Time Code receiver/generator 38 for processing by receiver/generator 38 which extracts time data from the GPS data and then provides a time data signal in an analog format to analog magnetic tape recorder 28.

It should be noted that an IRIG time code source may be substituted for GPS Time Code receiver/generator 38 to provide time data to analog magnetic tape recorder 28 as well as a frequency analyzer 38. The time code source, which may be receiver generator 38 or an IRIG time code source provides a common timing standard for correlating miss distance data with missile telemetry data. It should be understood that time data is not required to calculate miss distance. Time data is needed to determine the time of intercept by missile 12 with target 14 or the time of closest approach by missile 12 to target 14.

This time data signal is also supplied through analog magnetic tape recorder 28 to frequency analyzer 32. This time data signal allows the absolute or exact time of intercept by missile 12 with target 14 to be determined. In the event missile 12 misses target 14, the absolute or exact time at which the miss occurs may also be determined.

The N and N+2 outputs of recorder 28 are connected to a double balanced mixer 30 which has its output connected to a frequency analyzer 32. This allows the 900 kHz predetection carrier signal and the 924 kHz predetection carrier signal to be supplied to mixer 30 which produces a difference frequency signal which is the difference of the two input frequencies supplied to mixer 30. This difference frequency signal includes frequency offset and doppler shift. The difference frequency signal is supplied to frequency analyzer 32 along with the time data signal. Frequency analyzer 32 then generates the timing chart/plot of FIG. 2 illustrating the AN/DRQ-4 doppler frequency versus time with a 24 kHz offset.

From the timing chart/plot of FIG. 2 the miss distance is calculated using the following equation:

$$\text{miss distance} = \frac{\Delta f \Delta t \lambda}{4} \quad (1)$$

where $\Delta f$ is the difference between the incoming frequency and the outgoing frequency; $\Delta t$ is a time interval for the frequency curve of FIG. 2 to change from a frequency $f_1$ to a frequency $f_2$ and $\lambda$ is constant for a missile telemetry signal of a particular frequency.

The frequency $f_1$ is calculated using the following equation:

$$f_1 = \frac{f_{max} + f_{min}}{2} + \frac{0.707 \Delta f}{2} \quad (2)$$

Similarly, the frequency $f_2$ is calculated using the following equation:

$$f_2 = \frac{f_{max} + f_{min}}{2} - \frac{0.707 \Delta f}{2} \quad (3)$$

The frequency difference $\Delta f$ for the plot of FIG. 2 is the difference between the incoming frequency of 27,379 Hz and the outgoing frequency of 20,621 Hz which is 6758 Hz. The calculated value from equation 2 for the frequency $f_1$ is 26,389 Hz, while the calculated value from equation 3 for the frequency $f_2$ is 21,610 Hz. From FIG. 2 it may be observed that the frequency $f_1$ occurs at a time −0.02 seconds, while the frequency $f_2$ occurs at a time +0.02 seconds with the difference being $\Delta t$ which is 0.04 seconds.

$\lambda$ is calculated from the following equation:

$$\lambda = \frac{c}{f_m} \qquad (4)$$

where c is the speed of light and $f_m$ is the frequency of missile telemetry signal 18. The value of $\lambda$ for signal 18 is 0.444 for a frequency of 2215.5 MHz.

The miss distance for the plot of FIG. 2 may now be calculated using equation (1) with the following being the miss distance:

$$\text{miss distance} = \frac{\Delta f \Delta t \lambda}{4} = \frac{6758 \times 0.04 \times 0.444}{4} = 30 \text{ feet}$$

The incoming and outgoing frequencies are first determined by using frequency cursors on frequency analyzer 32 and then displayed on the display screen of frequency analyzer 32. In addition, the frequency cursors and the time cursors of frequency analyzer 32 can be used to determine $\Delta f$ and $\Delta t$ of equation (1). The frequency analyzer 32 used in the present invention is a Kay DSP frequency analyzer commercially available from Kay Elemetrics Corp. of Lincoln Park, N.J. It should be understood, however, that any other commercially device with similar capabilities may be used as frequency analyzer 32.

There is connected to frequency analyzer 32 a printer 34 which provides a printout of the timing chart/plot of FIG. 2.

From the foregoing description, it may readily be seen that the present invention comprises a new, unique and exceedingly useful miss distance indicator data processing and recording apparatus for providing an accurate measurement of the miss distance from a missile to a target the missile is attempting to intercept which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A miss distance indicator data processing and recording apparatus for determining and indicating a miss distance for a missile tracking a target comprising:

antenna means for receiving a radio frequency missile telemetry signal from said missile and a translated radio frequency missile telemetry signal from said target;

first receiver means connected to said antenna means to receive said radio frequency missile telemetry signal, said first receiver means filtering and amplifying said radio frequency missile telemetry signal and then down converting said radio frequency missile telemetry signal to a first predetection carrier signal;

second receiver means connected to said antenna means to receive said translated radio frequency missile telemetry signal, said second receiver means filtering and amplifying said translated radio frequency missile telemetry signal and then down converting said translated radio frequency missile telemetry signal to a second predetection carrier signal;

mixer means connected to said first receiver means to receive said first predetection carrier signal and said second receiver means to receive said second predetection carrier signal, said mixer means producing a difference frequency signal equal to the frequency difference between said first predetection carrier signal and said second predetection carrier signal;

frequency analyzer means connected to said mixer means to receive said difference frequency signal, said frequency analyzer means processing said difference frequency signal to generate a plot of doppler frequency versus time which is used to determine the miss distance said missile misses said target in accordance with the expression:

$$\text{miss distance} = \frac{\Delta f \Delta t \lambda}{4}$$

where $\Delta f$ is a frequency difference which said frequency analyzer means determines and then displays; $\Delta t$ is a time difference which said frequency analyzer means determines and then displays and $\lambda$ is constant for said radio frequency missile telemetry signal; and printer means connected to said frequency analyzer means, said printer means generating a printout of said plot of doppler frequency versus time.

2. The miss distance indicator data processing and recording apparatus of claim 1 wherein said first and second receiver means each comprise a telemetry receiver.

3. The miss distance indicator data processing and recording apparatus of claim 1 wherein said mixer means comprises a double balanced mixer.

4. The miss distance indicator data processing and recording apparatus of claim 1 wherein said radio frequency missile telemetry signal has a frequency of about 2215.5 Megahertz.

5. The miss distance indicator data processing and recording apparatus of claim 1 wherein said translated radio frequency missile telemetry signal has a frequency of about 1826 Megahertz.

6. The miss distance indicator data processing and recording apparatus of claim 1 wherein said constant $\lambda$ for said radio frequency missile telemetry signal is about 0.444.

7. A miss distance indicator data processing and recording apparatus for determining and indicating a miss distance for a missile tracking a target comprising:

an antenna for receiving a radio frequency missile telemetry signal from said missile and a translated radio frequency missile telemetry signal from said target;

a first telemetry receiver connected to said antenna to receive said radio frequency missile telemetry signal, said first telemetry receiver filtering and amplifying said radio frequency missile telemetry signal and then down converting said radio frequency missile telemetry signal to a first predetection carrier signal;

a second telemetry receiver connected to said antenna to receive said translated radio frequency missile telemetry signal, said second telemetry receiver filtering and amplifying said translated radio frequency missile telemetry signal and then down converting said translated radio frequency missile telemetry signal to a second predetection carrier signal;

a double balanced mixer connected to said first telemetry receiver to receive said first predetection carrier signal and said second telemetry receiver to receive said second predetection carrier signal, said double balanced mixer producing a difference frequency signal equal to the frequency difference between said first predetection carrier signal and said second predetection carrier signal;

a frequency analyzer connected to said double balanced mixer to receive said difference frequency signal;

said frequency analyzer processing said difference frequency signal to generate a plot of doppler frequency versus time which is used to determine the miss distance said missile misses said target in accordance with the expression:

$$\text{miss distance} = \frac{\Delta f \Delta t \lambda}{4}$$

where $\Delta f$ is a frequency difference which said frequency analyzer determines and then displays; $\Delta t$ is a time difference which said frequency analyzer determines and then displays and $\lambda$ is constant for said radio frequency missile telemetry signal; and a printer connected to said frequency analyzer, said printer generating a printout of said plot of doppler frequency versus time.

8. The miss distance indicator data processing and recording apparatus of claim 7 wherein said radio frequency missile telemetry signal has a frequency of about 2215.5 Megahertz.

9. The miss distance indicator data processing and recording apparatus of claim 7 wherein said translated radio frequency missile telemetry signal has a frequency of about 1826 Megahertz.

10. The miss distance indicator data processing and recording apparatus of claim 7 wherein said first predetection carrier signal has a frequency of about 900 kilohertz.

11. The miss distance indicator data processing and recording apparatus of claim 7 wherein said second predetection carrier signal has a frequency of about 924 kilohertz.

12. The miss distance indicator data processing and recording apparatus of claim 7 wherein said constant $\lambda$ for said radio frequency missile telemetry signal is about 0.444.

13. A miss distance indicator data processing and recording apparatus for determining and indicating a miss distance for a missile tracking a target comprising:

an antenna for receiving a radio frequency missile telemetry signal from said missile and a translated radio frequency missile telemetry signal from said target;

a first telemetry receiver connected to said antenna to receive said radio frequency missile telemetry signal, said first telemetry receiver filtering and amplifying said radio frequency missile telemetry signal and then down converting said radio frequency missile telemetry signal to a first predetection carrier signal;

a second telemetry receiver connected to said antenna to receive said translated radio frequency missile telemetry signal, said second telemetry receiver filtering and amplifying said translated radio frequency missile telemetry signal and then down converting said radio frequency missile telemetry signal to a second predetermined carrier signal;

an analog magnetic tape recorder connected to said first telemetry receiver to receive said first predetection carrier signal and said second telemetry receiver to receive said second predetection carrier signal, said analog magnetic tape recorder recording said first predetection carrier signal and said second predetection carrier signal;

a double balanced mixer connected to said analog magnetic tape recorder to receive said first predetection carrier signal and said second predetection carrier signal, said double balanced mixer producing a difference frequency signal equal to the frequency difference between said first predetection carrier signal and said second predetection carrier signal;

a frequency analyzer connected to said double balanced mixer to receive said difference frequency signal;

said frequency analyzer processing said difference frequency signal to generate a plot of doppler frequency versus time which is used to determine the miss distance said missile misses said target in accordance with the expression:

$$\text{miss distance} = \frac{\Delta f \Delta t \lambda}{4}$$

where $\Delta f$ is a frequency difference which said frequency analyzer determines and then displays; $\Delta t$ is a time difference which said frequency analyzer determines and then displays and $\lambda$ is constant for said radio frequency missile telemetry signal; and a printer connected to said frequency analyzer, said printer generating a printout of said plot of doppler frequency versus time.

14. The miss distance indicator data processing and recording apparatus of claim 13 wherein said radio frequency missile telemetry signal has a frequency of about 2215.5 Megahertz.

15. The miss distance indicator data processing and recording apparatus of claim 13 wherein said radio frequency target telemetry signal has a frequency of about 1826 Megahertz.

16. The miss distance indicator data processing and recording apparatus of claim 13 wherein said first intermediate frequency signal has a frequency of about 900 kilohertz.

17. The miss distance indicator data processing and recording apparatus of claim 13 wherein said second intermediate frequency signal has a frequency of about 924 kilohertz.

18. The miss distance indicator data processing and recording apparatus of claim 13 wherein said constant $\lambda$ for said radio frequency missile telemetry signal is about 0.444.

19. The miss distance indicator data processing and recording apparatus of claim 13 further comprising a time code generator connected to said analog magnetic tape recorder, said time code generator receiving externally generated position data, said time code generator extracting time data from said position data, said time code generator providing said time data to said analog magnetic tape recorder, said time code generator having a position data receiving antenna connected thereto.

20. A method for determining a miss distance for a missile tracking a target, comprising the steps of:

at a receiving location, receiving a radio frequency missile telemetry signal from said missile and a translated radio frequency missile telemetry signal from said target;

filtering and amplifying said radio frequency missile telemetry signal;

down converting said radio frequency missile telemetry signal to a first predetection carrier signal;

filtering and amplifying said translated radio frequency missile telemetry signal;

down converting said translated radio frequency missile telemetry signal to a second predetection carrier signal;

combining said first predetection carrier signal and said second predetection carrier signal to produce a difference frequency signal equal to the frequency difference between said first predetection carrier signal and said second predetection carrier signal;

at said receiving location, receiving global position system data, said global position system data including time data;

extracting said time data from said global position system data;

processing said difference frequency signal to generate a plot of doppler frequency versus time which is used to determine the miss distance said missile misses said target;

processing said time data to determine an exact time when said missile misses said target at said miss distance;

generating a printout of said plot of doppler frequency versus time.

* * * * *